(12) United States Patent
Sunami (10) Patent No.: US 10,996,905 B2
(45) Date of Patent: May 4, 2021

(54) IMAGE FORMING SYSTEM THAT USES PRESENCE CONFIRMATION REQUESTS AND RESPONSE REQUESTS FOR INSTALLATION OF A PRINTER DRIVER, IMAGE FORMING APPARATUS AND TERMINAL APPARATUS

(71) Applicant: KYOCERA Document Solutions Inc., Osaka (JP)

(72) Inventor: Wataru Sunami, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/612,395

(22) PCT Filed: Mar. 15, 2018

(86) PCT No.: PCT/JP2018/010092
§ 371 (c)(1),
(2) Date: Nov. 10, 2019

(87) PCT Pub. No.: WO2018/207459
PCT Pub. Date: Nov. 15, 2018

(65) Prior Publication Data
US 2020/0117405 A1    Apr. 16, 2020

(30) Foreign Application Priority Data

May 10, 2017    (JP) .............................. JP2017-093572
May 10, 2017    (JP) .............................. JP2017-093573

(51) Int. Cl.
G06F 3/12            (2006.01)

(52) U.S. Cl.
CPC .......... *G06F 3/1225* (2013.01); *G06F 3/1204* (2013.01); *G06F 3/1226* (2013.01); *G06F 3/1238* (2013.01); *G06F 3/1285* (2013.01)

(58) Field of Classification Search
None
See application file for complete search history.

(56) References Cited

U.S. PATENT DOCUMENTS

2005/0108705 A1    5/2005   Koyama
2013/0027746 A1*   1/2013   Sasase ............... H04N 1/00244
                                                          358/1.15

(Continued)

FOREIGN PATENT DOCUMENTS

JP     2005-141366 A        6/2005
JP     2007065894 A    *    3/2007
(Continued)

OTHER PUBLICATIONS

Translation of Japanese Application 2005-249918, corresponding to Japanese Application Publication 2007-065894 (Ono) (Year: 2007).*

*Primary Examiner* — Thomas D Lee
(74) *Attorney, Agent, or Firm* — Hawaii Patent Services; Nathaniel K. Fedde; Kenton N. Fedde (57) ABSTRACT

Provided is an image forming system capable of specifying an image forming apparatus to be used with minimum operation without requiring input of special information.
A terminal apparatus includes a printer searching unit that transmits a response request to an image forming apparatus from which there is a response to a presence confirmation request; an image forming apparatus includes: a response button generating unit that, after receiving the response request, generates a response button; and a printer information transmitting unit that, by operation of the response button, transmits printer information as a response to the response request; and the printer searching unit of the terminal apparatus causes the image forming apparatus from which there is a response to the response request to be highlighted in a display of a network printer list screen.

3 Claims, 8 Drawing Sheets

(56) References Cited

U.S. PATENT DOCUMENTS

2014/0006583 A1    1/2014  Sugimoto et al.
2014/0036305 A1*   2/2014  Nakamura ......... H04N 1/00281
                                                        358/1.15
2016/0004485 A1    1/2016  Sasase

FOREIGN PATENT DOCUMENTS

JP    2013-029898 A    2/2013
JP    2014-010718 A    1/2014
JP    2016-018505 A    2/2016

* cited by examiner

FIG.6

IMAGE FORMING SYSTEM THAT USES PRESENCE CONFIRMATION REQUESTS AND RESPONSE REQUESTS FOR INSTALLATION OF A PRINTER DRIVER, IMAGE FORMING APPARATUS AND TERMINAL APPARATUS

TECHNICAL FIELD

The present invention relates to an image forming system in which a terminal apparatus and an image forming apparatus are connected via a network.

BACKGROUND ART

In an image forming system in which a terminal apparatus such as a personal computer and the like and an image forming apparatus such as a printer and the like having a printing function are connected via a network, in a case where the image forming apparatus is used from the terminal apparatus, it is necessary to specify an image forming apparatus to be used on the network and install a printer driver corresponding to the specified image forming apparatus in the terminal apparatus.

In a case where many image forming apparatuses are connected to the network, it is not easy to specify the image forming apparatus to be used, and it is necessary to check the model name of the image forming apparatus, and the IP address and apparatus name on the network.

Therefore, a technique has been proposed in which a terminal apparatus receives an identification code for identifying an image forming apparatus and displays a list of only image forming apparatuses having the same identification code (refer, for example, to a printer driver in Patent Literature 1). As a result, the user may easily select a printer to be used, and an appropriate printer driver may be installed.

CITED LITERATURE

Patent Literature

Patent Literature 1: JP 2016-018505 A

SUMMARY OF INVENTION

Technical Problem

However, in the related art, it is assumed that a user needs to input an identification code to the terminal apparatus, and that the user will recognize the identification code and input the identification code correctly. Therefore, in a case where the user forgets the identification code, it takes time to check the identification code, and in a case where the input of the identification code is wrong, re-entry is required, so this is not necessarily an efficient printer driver installation procedure.

In consideration of the situation described above, an object of the present invention is to provide an image forming system that can specify an image forming apparatus to be used with minimum operation and without requiring input of special information.

Solution to Problem

The image forming system of the present invention is an image forming system in which a terminal apparatus and a plurality of image forming apparatuses having a printer function are connected via a network; wherein the terminal apparatus includes: a printer searching unit that transmits a presence confirmation request to the plurality of image forming apparatuses to confirm the presence thereof, generates a list of image forming apparatuses from which there is a response as a network printer list screen, and transmits a response request to the image forming apparatuses from which there is a response; a terminal display unit that displays the network printer list screen; and an installation executing unit that executes installation of a printer driver corresponding to the image forming apparatus for which an instruction is given on the network printer list screen; and each of the image forming apparatuses includes: a response button generating unit that generates a response button after receiving the response request; an operation unit that displays the response button and receives operation of the response button; and a printer information transmitting unit that in response to the presence confirmation request, transmits printer information for identifying own apparatus, and by operation of the response button, transmits the printer information as a response to the response request; wherein the printer searching unit of the terminal apparatus causes the image forming apparatus from which there is a response to the response request to be highlighted in the display of the network printer list screen.

Moreover, the image forming system of the present invention is an image forming system in which a terminal apparatus and a plurality of image forming apparatuses having a printer function are connected via a network; wherein the terminal apparatus includes: a printer searching unit that transmits a presence confirmation request to the plurality of image forming apparatuses to confirm the presence thereof, generates a list of image forming apparatuses from which there is a response as a network printer list screen, and transmits a response request that includes operator information for identifying the user to the image forming apparatus from which there is a response; a terminal display unit that displays the network printer list screen; and an installation executing unit that executes installation of a printer driver corresponding to the image forming apparatus for which an instruction is given on the network printer list screen; and each image forming apparatus includes: a storage unit that stores user information; a user authenticating unit that performs user authentication by comparing inputted authentication information with the user information; a response button generating unit that generates a response button after receiving the response request; an operation unit that displays the response button and receives operation of the response button; and a printer information transmitting unit that in response to the presence confirmation request transmits printer information for identifying own apparatus, and by operation of the response button, transmits the printer information as a response to the response request; wherein in the image forming apparatus, the response button can be operated only in a case where the operator information included in the response request matches the user authenticated user; and the printer searching unit causes the image forming apparatus from which there is a response to the response request to be highlighted in the display of the network printer list screen.

The image forming apparatus of the present invention is an image forming apparatus having a printer function and that is connected with a terminal apparatus via a network, and includes: a response button generating unit that, after receiving a response request from the terminal apparatus, generates a response button; an operation unit that displays the response button and receives operation of the response button; and a printer information transmitting unit that, in response to a presence confirmation request from the terminal apparatus, transmits printer information for identifying own apparatus, and by operation of the response button, transmits the printer information as a response to the response request.

In addition, the terminal apparatus of the present invention is a terminal apparatus that is connected via a network to a plurality of image forming apparatuses having a printer function, and includes: a printer searching unit that transmits a presence confirmation request to the plurality of image forming apparatuses to confirm the presence thereof, generates a list of image forming apparatuses from which there is a response as a network printer list screen, and transmits a response request to the image forming apparatuses from which there is a response; a terminal display unit that displays the network printer list screen; and an installation executing unit that executes installation of a printer driver corresponding to the image forming apparatus for which an instruction is given on the network printer list screen; wherein the printer searching unit causes the image forming apparatus from which there is a response to the response request to be highlighted in the display of the network printer list screen.

Effect of Invention

With the present invention, the image forming apparatus on which the response button is operated is highlighted in the display of the network printer list screen, so there is an effect of being capable of specifying an image forming apparatus to be used with minimum operation without requiring the input of special information on the terminal apparatus side; and furthermore, it is possible to identify the operator that has operated the response button, so there is an effect of being capable of preventing erroneous selection of the printer driver to be installed.

DESCRIPTION OF EMBODIMENTS

Next, embodiments of the present invention will be described in detail with reference to the drawings. Note that in the following embodiments, the same reference numbers are given to configurations having similar functions, and descriptions thereof will be omitted as appropriate.

First Embodiment

Figure 1:
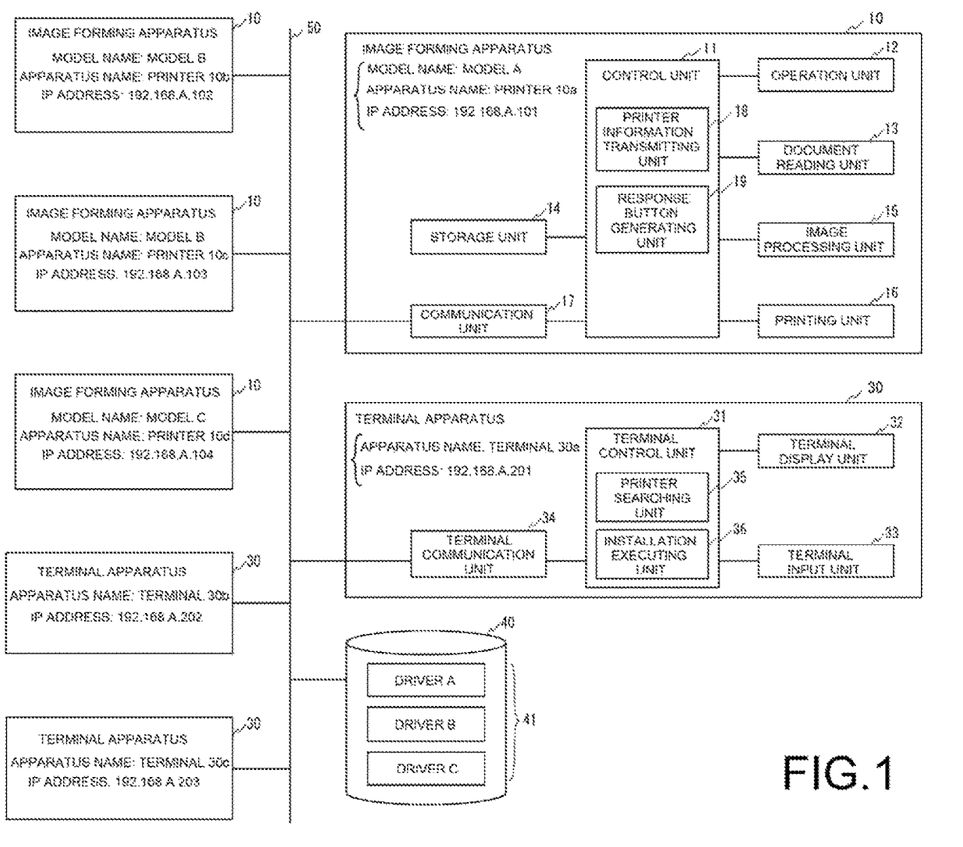
FIG. 1 is a block diagram illustrating a schematic configuration of an image forming system according to a first embodiment of the present invention.

In the image forming system of a first embodiment, referring to FIG. 1, a plurality of image forming apparatuses 10, a plurality of terminal apparatuses 30, and a server 40 are connected via a network 50 such as a LAN, the Internet, or the like.

The image forming apparatus 10 is an apparatus having a printing function such as a copying machine, a multifunction machine, or the like, and referring to FIG. 1, includes a control unit 11, an operation unit 12, a document reading unit 13, a storage unit 14, an image processing unit 15, a printing unit 16, and a communication unit 17. FIG. 1 illustrates an example in which four image forming apparatuses 10 are connected to a network 50, and different apparatus names and IP addresses are assigned to the four image forming apparatuses 10, respectively.

The operation unit 12 includes a touch panel, various operation keys such as a numeric keypad, a reset key, a stop key, a start key, and the like, and is a user interface that functions as a display unit and an input unit.

The document reading unit 13 is a scanner that reads a document image by irradiating light on a document that is fed by a document feeding apparatus (not illustrated), or a document that is placed on a platen glass, and receiving the reflected light or the like.

The image processing unit 15 is a unit that performs specified image processing on document data, for example, performs image processing such as enlargement/reduction processing, density adjustment, gradation adjustment and the like.

The printing unit 16 is a printing unit that prints a document image based on image data read by the document reading unit 13, document data stored in the storage unit 14, and document data received by the communication unit 17.

The communication unit 17 has a function of transmitting and receiving various data to and from a terminal apparatus 30 via a network 50 such as a LAN, the Internet, or the like.

The control unit 11 is an information processing unit such as a microcomputer and the like including a CPU (Central Processing Unit), a ROM (Read Only Memory), a RAM (Random Access Memory), and the like. The ROM stores a control program for performing operation control of the image forming apparatus 10. The CPU of the control unit 11 reads the control program stored in the ROM and develops the control program in the RAM, thereby performing overall control of the apparatus.

The control unit 11 functions as a printer information transmitting unit 18 and a response button generating unit 19.

The printer information transmitting unit 18, in response to a presence confirmation request from the terminal apparatus 30, transmits printer information for identifying own apparatus. In this embodiment, the printer information transmitting unit 18 transmits a model name, an apparatus name, and an IP address as printer information.

When a response request is received from the terminal apparatus 30, the response button generating unit 19 generates a response button for responding to the response request on a display screen displayed on the operation unit 12. Then, when the response button generated by the response button generating unit 19 is operated, the printer information transmitting unit 18 transmits the printer information as a response to the response request.

The storage unit 14 is a storage unit such as a semiconductor memory, HDD (Hard Disk Drive) or the like, and stores document data read by the document reading unit 13 and document data received by the communication unit 17.

The terminal apparatus 30 is an information processing apparatus such as a personal computer or the like, and referring to FIG. 1, includes a terminal control unit 31, a terminal display unit 32 such as a liquid crystal display or the like, a terminal input unit 33 such as a keyboard or the like, and a terminal communication unit 34. FIG. 1 illustrates an example in which three terminal apparatuses 30 are connected to a network 50, and different apparatus names and IP addresses are assigned to the three terminal apparatuses 30, respectively.

The terminal communication unit 34 has a function of transmitting and receiving various data to and from an image forming apparatus 10 via a network 50 such as a LAN, the Internet, or the like.

The terminal control unit 31 is an information processing unit such as a microcomputer and the like including a CPU (Central Processing Unit), a ROM (Read Only Memory), a RAM (Random Access Memory), and the like. The ROM stores a control program for performing operation control of the terminal apparatus 30. The CPU of the terminal control unit 31 reads the control program stored in the ROM and develops the control program in the RAM, thereby performing overall control of the apparatus.

In addition, the terminal control unit 31 functions as a printer searching unit 35 and an installation executing unit 36.

When registering the image forming apparatus 10 to be used, or in other words, when installing a printer driver corresponding to the image forming apparatus 10 to be used, the printer searching unit 35 confirms the presence of the image forming apparatuses 10 connected to the network 50 and generates a list of image forming apparatuses 10 from which there is a response as a network printer list screen, and causes that list screen to be displayed on the terminal display unit 32.

The installation executing unit 36 reads the printer driver corresponding to the image forming apparatus 10, for which an instruction is given on the network printer list screen, from the server 40, and executes the installation of the read printer driver.

The server 40 is a storage device installed to share files on the network 50, and stores printer drivers 41 (drivers A to C corresponding to the respective models A to C) corresponding to the image forming apparatuses 10 connected to the network 50. Incidentally, the printer drivers 41 may be stored in the storage units 14 of the image forming apparatuses 10 or the storage units (not illustrated) of the terminal apparatuses 30.

Next, in reference to FIG. 2 to FIG. 4B, the sequence when installing the printer driver 41 (driver A) corresponding to the image forming apparatus 10 (model name: printer 10a, IP address; 192.168.A.101) in the terminal apparatus 30 (apparatus name: terminal 30a, IP address: 192.168.A.201) will be described in detail. Hereinafter, the terminal apparatus 30 and the image forming apparatus 10 will be called by the appropriate apparatus name.

Figure 2:
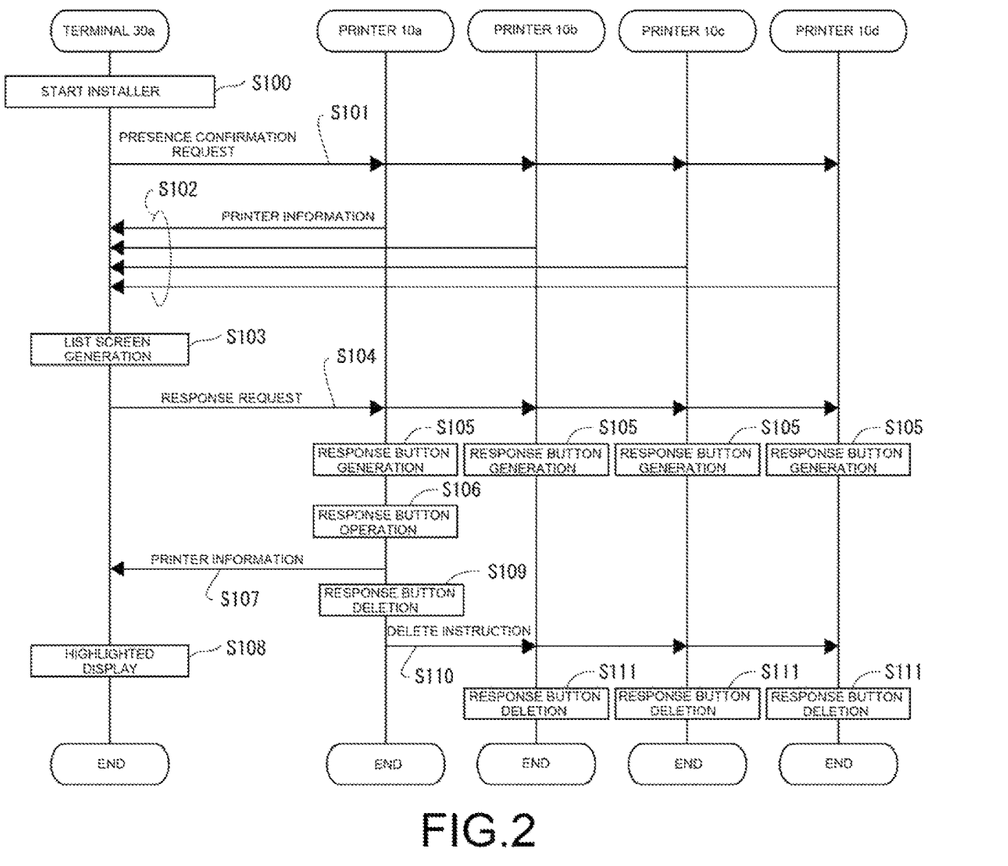
FIG. 2 is a sequence diagram illustrating a printer driver installation sequence in the image forming system illustrated in FIG. 1.

Referring to FIG. 2, when registering the printer 10a in the terminal 30a, or in other words, in a case of installing the printer driver 41 (driver A) corresponding to the printer 10a to be used, the user starts the installer (step S100).

By starting the installer, the terminal control unit 31 of the terminal 30a functions as the printer searching unit 35, and transmits a presence confirmation request for confirming the presence of the image forming apparatuses 10 connected to the network 50 by a broadcast to the network 50 (step S101). Note that the presence confirmation request includes terminal information (apparatus name and IP address) that identifies the transmission source terminal 30a.

The control units 11 of the printers 10a to 10d that have received the presence confirmation request function as the printer information transmitting units 18, and in response to the presence confirmation request, transmit the model name, apparatus name, and IP address that identify the own apparatus as printer information (step S102).

Figure 3A:
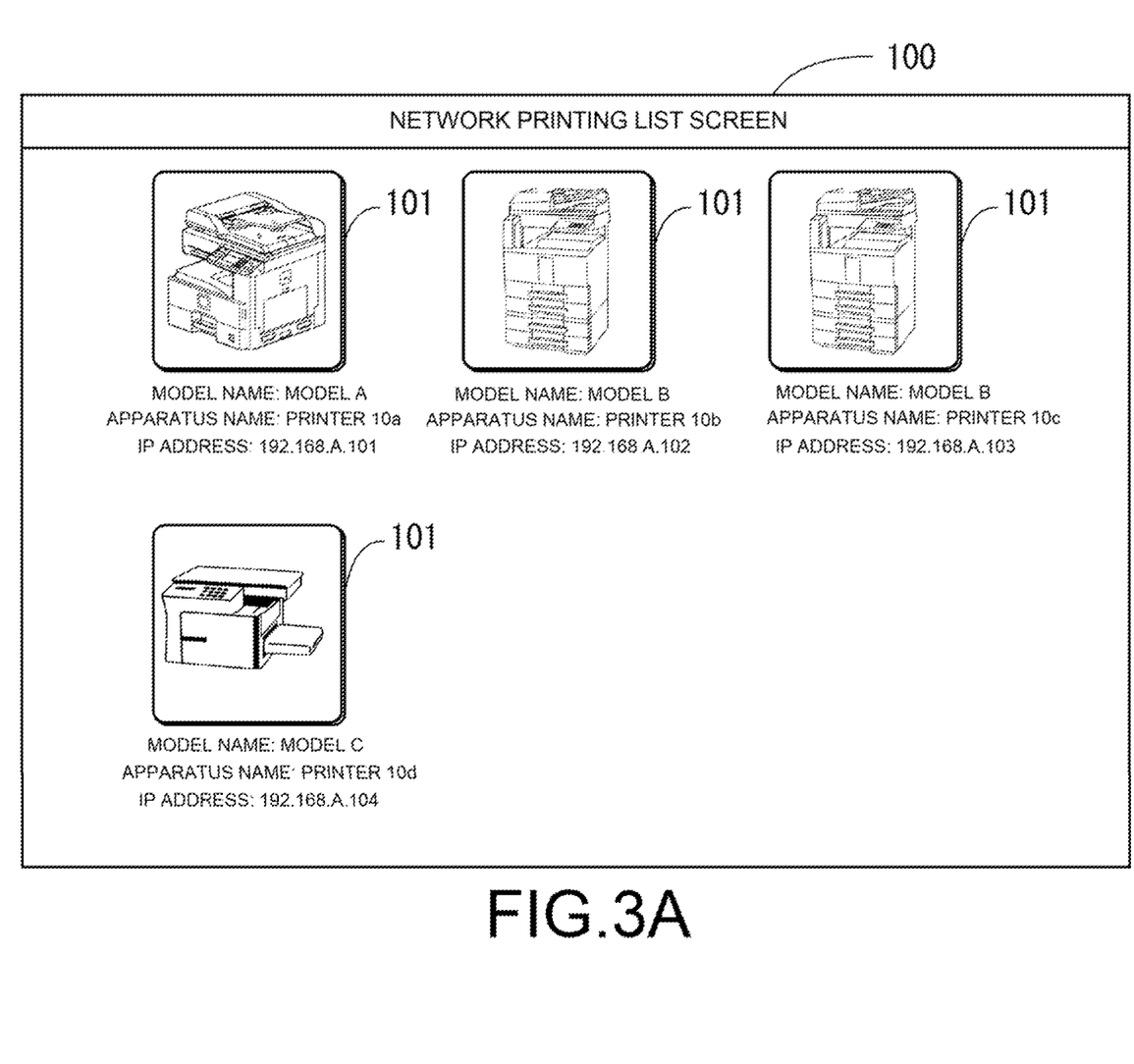
FIG. 3A and FIG. 3B are diagrams illustrating an example of a network printer list screen displayed on the display unit of the terminal apparatus illustrated in FIG. 1.

When the printer information is received from the printers 10a to 10d, the printer searching unit 35 generates a list of image forming apparatuses 10 (printers 10a to 10d) from which there is a response as a network printer list screen 100 such as illustrated in FIG. 3A, and causes that list screen to be displayed on the terminal display unit 32 (step S103).

As illustrated in FIG. 3A, icons 101 and printer information corresponding to the printers 10a to 10d are arranged on the network printer list screen 100, and the icons 101 function as operation buttons for instructing installation.

In addition, the printer searching unit 35 transmits a response request instructing generation of a response button to each of the image forming apparatuses 10 (printers 10a to 10d) from which there is a response (step S104). Note that the response request includes terminal information (apparatus name and IP address) that identifies the terminal 30a that is the transmission source.

Figure 4A:
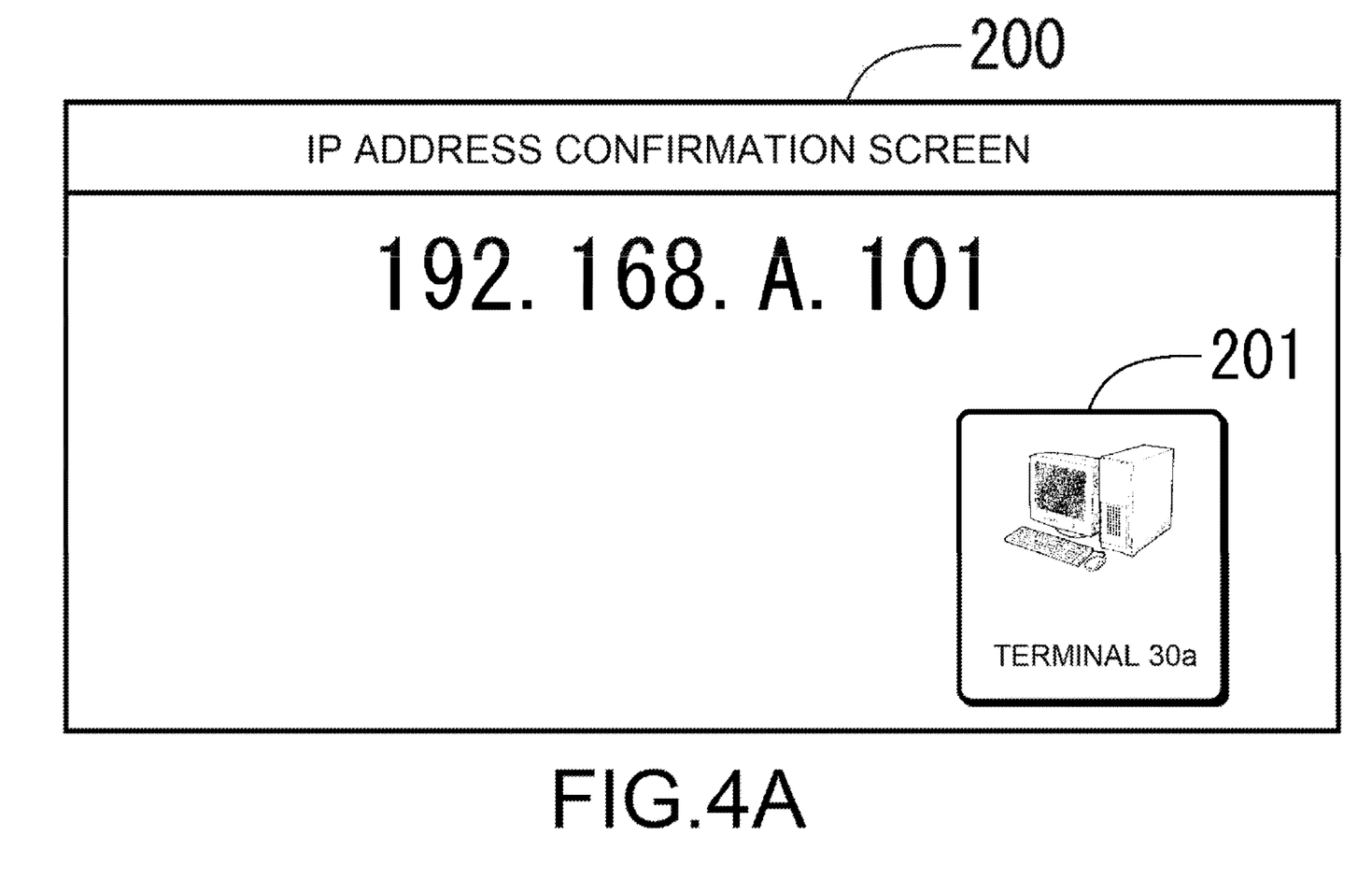
FIG. 4A and FIG. 4B are diagrams illustrating an example of an IP address confirmation screen displayed on the operation unit of the image forming apparatus illustrated in FIG. 1.

The control units 11 of the printers 10a to 10d that have received the response request function as response button generating units 19. In the present embodiment, as illustrated in FIG. 4A, the response button generating unit 19 generates a response button 201 correlated with terminal information included in the response request on an IP address confirmation screen 200 for confirming the IP address (step S105). Note that the generation of the response button 201 does not require advance preparation of the IP address confirmation screen 200 in which the response button 201 is arranged, and the response button 201 may be generated on the screen when displaying the IP address confirmation screen 200 on the operation unit 12.

Figure 4B:
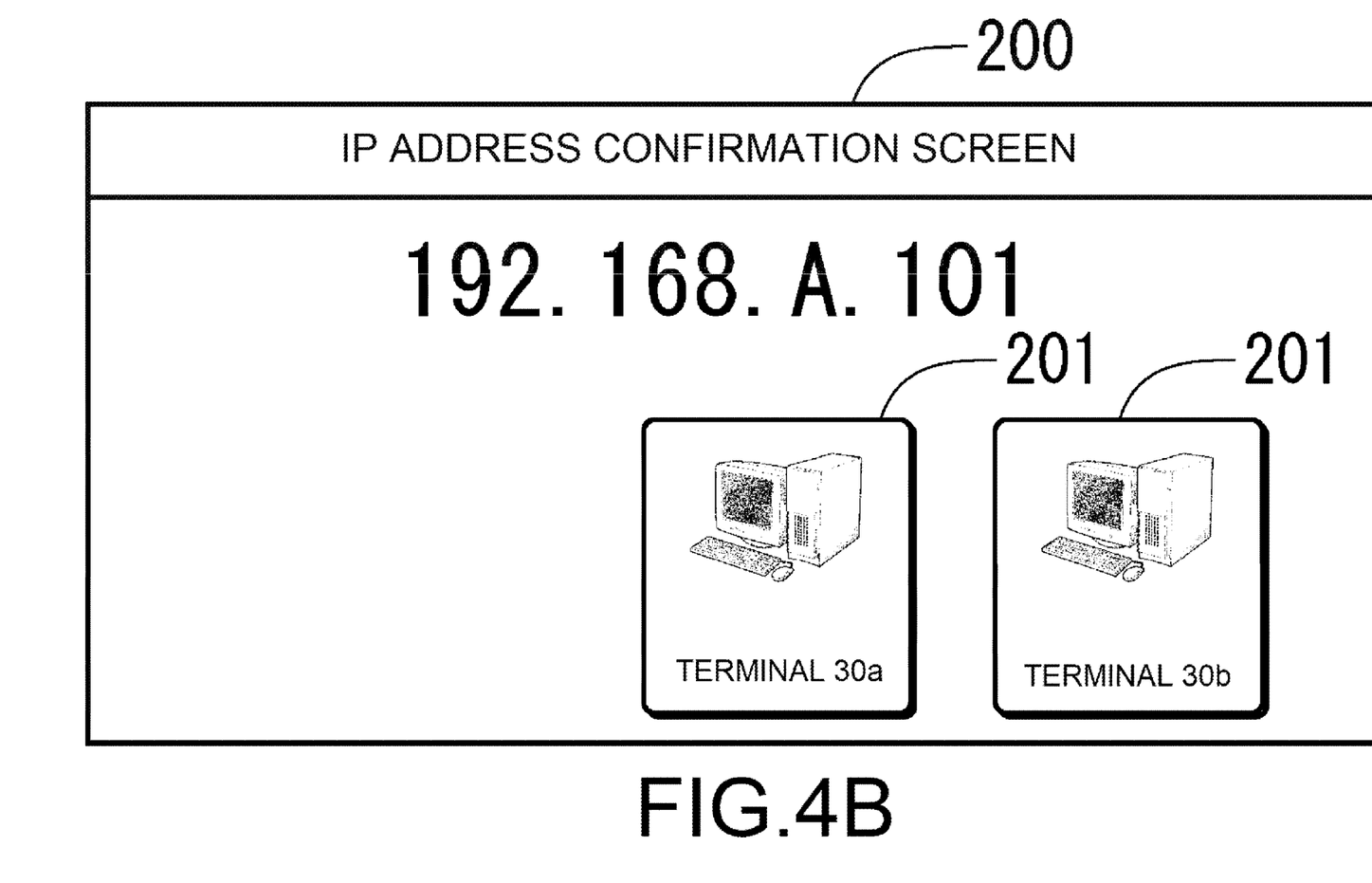

Moreover, when generating the response button 201, the response button generating unit 19 writes terminal information (terminal name) in or around the response button 201 as identification information for identifying the transmission source of the response request. As a result, as illustrated in FIG. 4B, even in a case where response requests are received from a plurality of terminal apparatuses 30 (terminals 30a and 30b) respectively and a plurality of response buttons 201 are generated, the user knows the transmission source of the response request and can operate the response button 201.

By operating the icon 101 on the network printer list screen 100 illustrated in FIG. 3A, the control unit 11 functions as the installation executing unit 36, reads the printer driver corresponding to the icon 101 from the server 40, and executes installation of the read printer driver. However, in a case where the user does not know the printer information, the icon 101 corresponding to the image forming apparatus 10 to be used cannot be identified by just the network printer list screen 100. In this case, the user goes to the image forming apparatus 10 (printer 10a) to be used, and operates the response button 201 (terminal 30a) on the printer 10a (step S106).

When the response button 201 (terminal 30a) is operated, the control unit 11 of the printer 10a functions as the printer information transmitting unit 18, and transmits printer information to the terminal 30a as a response to the response request (step S107).

Figure 3B:
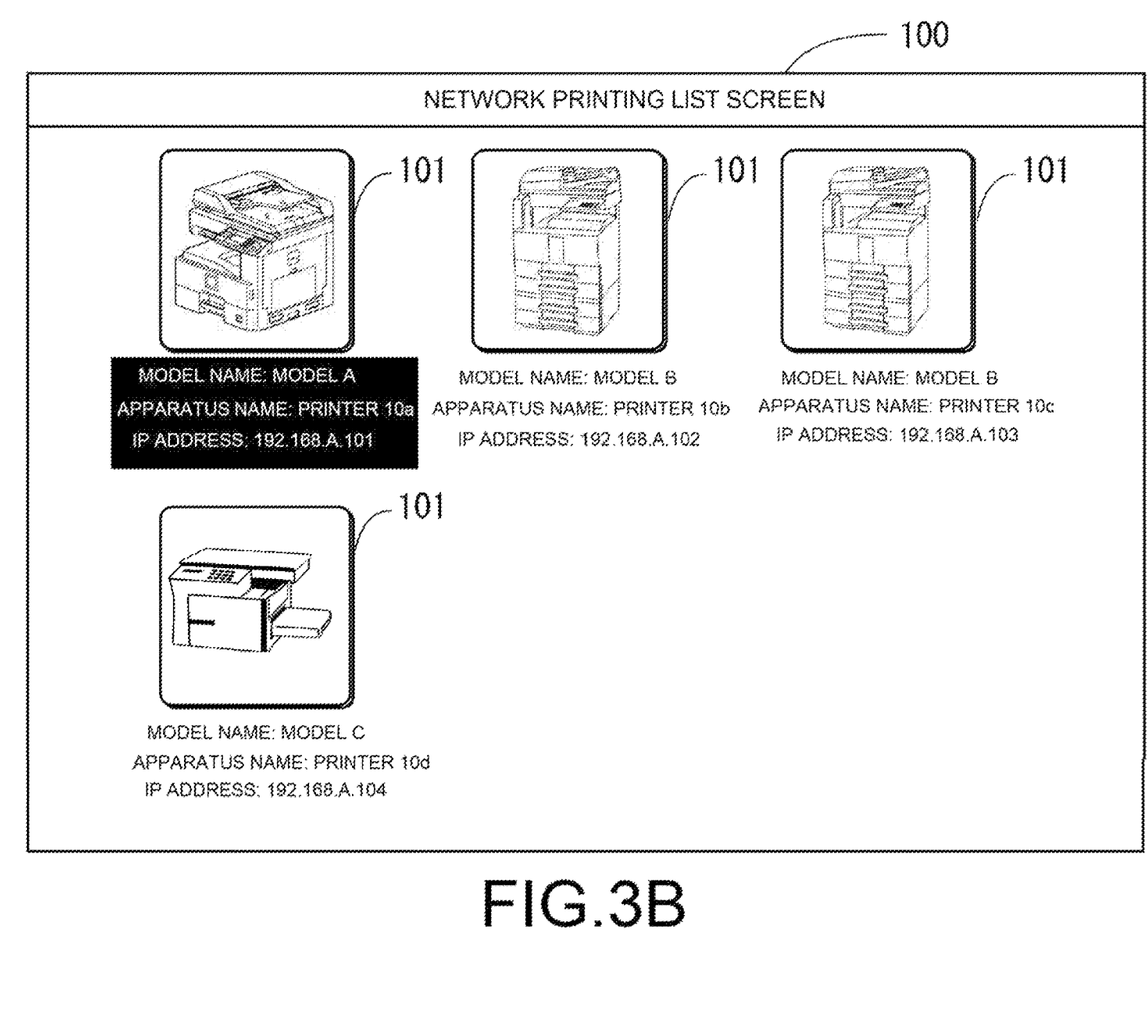

When the printer searching unit 35 of the terminal 30a receives printer information (printer 10a) that is a response to the response request, an icon 101 of the image forming apparatus 10 (printer 10a) from which there is a response is highlighted in the display on the network printer list screen 100 as illustrated in FIG. 3B (step S108). The highlighted display may be performed by inversion, color, flashing, or the like. Note that it is not necessary to highlight the display of the icon 101 itself, and the icon 101 may be highlighted by inverting or flashing an area surrounding the icon 101.

Then, the user returns to the terminal 30a and operates the highlighted icon 101. As a result, even in a case where the user does not know the printer information, the printer driver corresponding to the printer 10a may be installed without making a mistake.

Moreover, when transmitting the printer information in step S107, the printer information transmitting unit 18 instructs the response button generating unit 19 to delete the response button 201 and causes the response button 201 to be deleted (step S109), and transmits a deletion instruction for giving an instruction to delete the response button 201 by a broadcast to the network 50 (step S110), to cause the other image forming apparatuses 10 (printers 10b to 10d) to also delete the response button 201 (step S111).

Note that the deletion of the response button 201 does not mean only deletion of the displayed response button 201 but includes not generating the response button 201 when the IP address confirmation screen 200 is displayed.

Moreover, a display time set by the user of the response button 201 may be included in the response request, and the response button generating unit 19 may automatically delete the response button 201 when the display time has elapsed. In this case, the display time of the response button 201 is set assuming the amount of time to go to the image forming apparatus 10 to operate the response button 201. As a result, when the set display time has elapsed, the response button 201 of each printer is deleted, so cases in which other users operate the response button 201 may be reduced. Therefore, it is possible to reduce cases in which an unintended image forming apparatus 10 is highlighted on the network printer list screen 100.

Second Embodiment

In the image forming system according to a second embodiment, the image forming apparatus 10' has a user authentication function.

Figure 5:
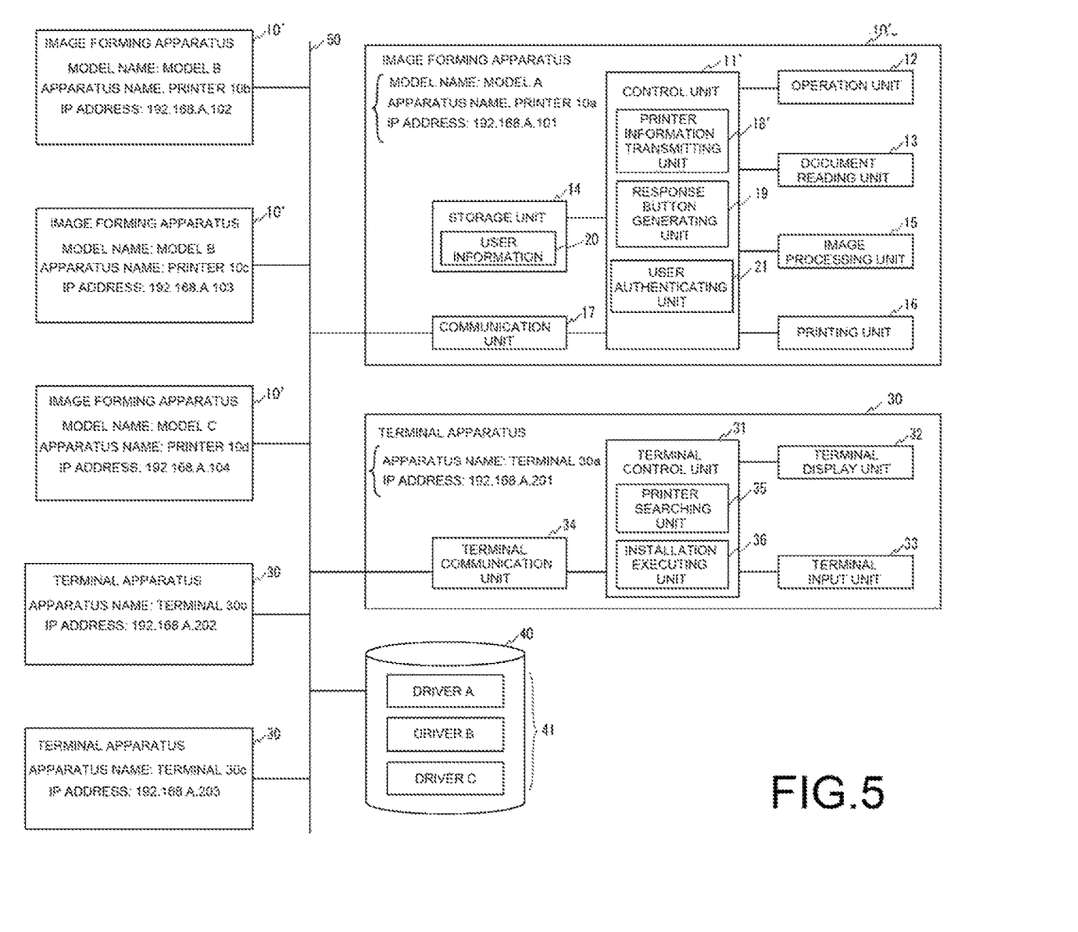
FIG. 5 is a block diagram illustrating a schematic configuration of an image forming system according to a second embodiment of the present invention.

Referring to FIG. 5, user information 20 for performing user authentication is stored in the storage unit 14 of the image forming apparatus 10'. The user information 20 is user information such as a user name, a user ID or the like that identifies a user that is permitted to use the image forming apparatus 10'. Then, the control unit 11' functions as a user authenticating unit 20 and performs user authentication by comparing authentication information inputted from the operation unit 12, a card reader (not illustrated) or the like with the user information 20.

The image forming apparatus 10' is set to a login state that permits use by the user according to the user authentication. Then, when the response button 201 is operated, the control unit 11' functions as the printer information transmitting unit 18', and transmits the user information of the logged-in user together with the printer information to the terminal apparatus 30 as a response to the response request.

Figure 6:
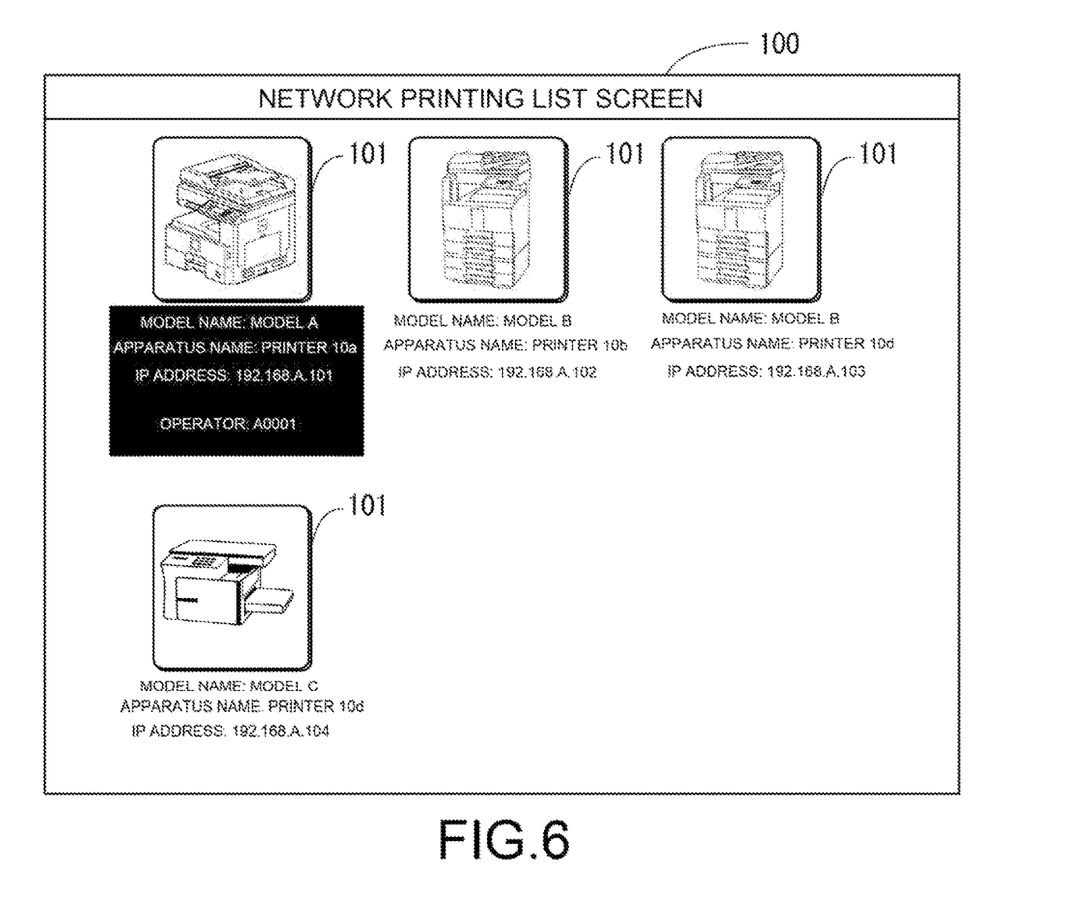
FIG. 6 is a diagram illustrating an example of a network printer list screen displayed on the display unit of the terminal apparatus illustrated in FIG. 5

As a result, the terminal apparatus 30, as illustrated in FIG. 6, highlights the display of the icon 101 of the image forming apparatus 10 from which there is a response on the network printer list screen 100, and causes the user information of the user that has operated the response button 201 to be displayed. In the example illustrated in FIG. 6, the user ID "A0001" is displayed as the operator that has operated the response button 201 on the printer 10a. As a result, the operator that has operated the response button 201 can be specified, so it is possible to prevent an erroneous selection of the printer driver to be installed.

It should be noted that the response button 201 may be operable only in a case where the operator information, including the operator information for specifying the user in the response request, matches the user authenticated user by the image forming apparatus 10'. In this case, unintentional operation of the response button 201 by another user can be prohibited.

As described above, the first embodiment is an image forming system in which a terminal apparatus 30 and a plurality of image forming apparatuses 10 having a printer function are connected via a network 50; wherein the terminal apparatus 30 includes: a printer searching unit 35 that transmits a presence confirmation request to the plurality of image forming apparatuses 10 to confirm the presence thereof, generates a list of image forming apparatuses 10 from which there is a response as a network printer list screen 100, and transmits a response request to the image forming apparatus 10 from which there is a response; a terminal display unit 32 that displays the network printer list screen 100; and an installation executing unit 36 that executes installation of a printer driver 41 corresponding to the image forming apparatus 10 for which an instruction is given on the network printer list screen 100; and each image forming apparatus 10 includes: a response button generating unit 19 that generates a response button 201 after receiving a response request; an operation unit 12 that displays the response button 201 and receives operation of the response button 201; and a printer information transmitting unit 18 that in response to a presence confirmation request, transmits printer information for identifying own apparatus, and by operation of the response button 201, transmits the printer information as a response to a response request; and the printer searching unit 35 of the terminal apparatus 30 causes the image forming apparatus 10 from which there is a response to the response request to be highlighted on the display of the network printer list screen 100.

With this configuration, the image forming apparatus 10 on which the response button 201 is operated is highlighted in the display of the network printer list screen 100, so the image forming apparatus to be used can be specified with minimum operation without requiring input of special information on the terminal apparatus 30 side.

Moreover, the second embodiment is an image forming system in which a terminal apparatus 30 and a plurality of image forming apparatuses 10' having a printer function are connected via a network 50; wherein the terminal apparatus 30 includes: a printer searching unit 35 that transmits a presence confirmation request to the plurality of image forming apparatuses 10' to confirm the presence thereof, generates a list of image forming apparatuses 10' from which there is a response as a network printer list screen 100, and transmits a response request to the image forming apparatus 10' from which there is a response; a terminal display unit 32 that displays the network printer list screen 100; and an installation executing unit 36 that executes installation of a printer driver 41 corresponding to the image forming apparatus 10' for which an instruction is given on the network printer list screen 100; and each image forming apparatus 10' includes: a storage unit 14 that stores user information 20; a user authenticating unit 21 that performs user authentication by comparing inputted authentication information with the user information 20; a response button generating unit 19 that generates a response button 201 after receiving a response request; an operation unit 12 that displays the response button 201 and receives operation of the response button 201; a printer information transmitting unit 18' that in response to the presence confirmation request transmits printer information for identifying own apparatus, and by operation of the response button 201, transmits the printer information and user information 20 of an user authenticated user as a response to the response request; and the printer searching unit 35 of the terminal apparatus 30 causes the image forming apparatus 10' from which there is a response to the response request to be highlighted in the display of the network printer list screen 100, and causes the user information 20 of the user that has operated the response button 201 to be displayed.

With this configuration, the image forming apparatus 10' on which the response button 201 is operated is highlighted in the display of the network printer list screen 100, so the image forming apparatus to be used can be specified with minimum operation without requiring input of special information on the terminal apparatus 30 side. Moreover, the operator that has operated the response button 201 can be specified, so it is possible to prevent an erroneous selection of the printer driver to be installed.

Moreover, the second embodiment is an image forming system in which a terminal apparatus 30 and a plurality of image forming apparatuses 10' having a printer function are connected via a network 50; wherein the terminal apparatus 30 includes: a printer searching unit 35 that transmits a presence confirmation request to the plurality of image forming apparatuses 10' to confirm the presence thereof, generates a list of image forming apparatuses 10' from which there is a response as a network printer list screen 100, and transmits a response request that includes operator information for identifying the user to the image forming apparatus 10' from which there is a response; a terminal display unit 32 that displays the network printer list screen 100; and an installation executing unit 36 that executes installation of a printer driver 41 corresponding to the image forming apparatus 10' for which an instruction is given on the network printer list screen 100; and each image forming apparatus 10' includes: a storage unit 14 that stores user information 20; a user authenticating unit 21 that performs user authentication by comparing inputted authentication information with the user information 20; a response button generating unit 19 that generates a response button 201 after receiving a response request; an operation unit 12 that displays the response button 201 and receives operation of the response button 201; a printer information transmitting unit 18 that in response to the presence confirmation request transmits printer information for identifying own apparatus, and by operation of the response button 201, transmits the printer information as a response to the response request; and in the image forming apparatus 10', the response button 201 can be operated only in a case where the operator information included in the response request matches the user authenticated user; and the printer searching unit 35 of the terminal apparatus 30 causes the image forming apparatus 10' from which there is a response to the response request to be highlighted in the display of the network printer list screen 100.

With this configuration, the image forming apparatus 10' on which the response button 201 is operated is highlighted in the display of the network printer list screen 100, so the image forming apparatus to be used can be specified with minimum operation without requiring input of special information on the terminal apparatus 30 side. In addition, unintended operation of the response button 201 by another user can be prohibited.

Furthermore, according to each of the embodiments described above, the response button generating unit 19 generates a response button 201 on an IP address confirmation screen 200 for confirming the IP address of the image forming apparatus 10.

With this configuration, the response button 201 is arranged on the IP address confirmation screen 200 that is displayed only at the time of various settings, so unintended operation of the response button 201 can be prevented.

Further, according to each of the embodiments described above, when the printer information transmitting unit 18 transmits printer information as a response to a response request, the printer information transmitting unit 18 instructs the response button generating unit 19 to delete the response button 201 and causes the response button 201 to be deleted, and transmits a delete instruction to the other image forming apparatuses 10 for giving an instruction to delete the response button 201.

With this configuration, it is possible to prevent unintended operation of the response button 201 in another image forming apparatus 10.

Furthermore, according to each of the embodiments described above, the printer searching unit 35 of the terminal apparatus 30 transmits a response request including the display time set by the user, and the response button generating unit 19 of the image forming apparatus 10 generates a response button 201, after which the response button 201 is automatically deleted after the display time has elapsed.

With this configuration, by setting the display time of the response button 201 assuming the amount of time required to go to the image forming apparatus 10 and operate the response button 201, the response button 201 of each printer is deleted after the set display time has elapsed, and it is possible to reduce cases in which other users operate the response button 201.

Note that the present invention is not limited to the embodiments, described above, and it is obvious that the embodiments can be appropriately changed within the scope of the technical idea of the present invention.

The invention claimed is:

1. An image forming system in which a terminal apparatus and a plurality of image forming apparatuses comprising a printer function are connected via a network, wherein
   the terminal apparatus comprises:
   a printer searching unit that transmits a presence confirmation request to the plurality of image forming apparatuses to confirm the presence thereof, generates a list of image forming apparatuses from which there is a response as a network printer list screen, and transmits a response request to the image forming apparatuses from which there is a response;
   a terminal display unit that displays the network printer list screen; and
   an installation executing unit that executes installation of a printer driver corresponding to an image forming apparatus for which an instruction is given on the network printer list screen;
   each image forming apparatus of the plurality of image forming apparatuses comprises:

a response button generating unit that generates a response button after receiving the response request;

an operation unit that displays the response button and receives operation of the response button;

a storage unit that stores user information;

a control unit configured to perform user authentication by comparing inputted authentication information with the user information; and a printer information transmitting unit that, in response to the presence confirmation request, transmits printer information for identifying own apparatus, and by operation of the response button by a user which was authenticated by the user authentication, transmits printer information for identifying own apparatus and the user information, of the authenticated user that operated the response button, as a response to the response request; wherein the printer searching unit causes an image forming apparatus from which there is a response to the response request to be highlighted in the display of the network printer list screen, and causes the user information of the authenticated user that operated the response button to be displayed.

2. An image forming apparatus having a printer function and that is connected with a terminal apparatus via a network, wherein the image forming apparatus comprises:

a response button generating unit that, after receiving a response request from the terminal apparatus, generates a response button;

an operation unit that displays the response button and receives operation of the response button;

a printer information transmitting unit that, in response to a presence confirmation request from the terminal apparatus, transmits printer information for identifying own apparatus, and by operation of the response button, transmits the printer information as a response to the response request;

a storage unit that stores user information; and a control unit configured to perform user authentication by comparing inputted authentication information with the user information; wherein the printer information transmitting unit, in response to the presence confirmation request, transmits printer information for identifying own apparatus, and by operation of the response button, transmits the printer information and the user information of a user, which was authenticated by the user authentication, as a response to the response request.

3. A terminal apparatus that is connected via a network to a plurality of image forming apparatuses having a printer function, the terminal apparatus comprising:

a printer searching unit that transmits a presence confirmation request to the plurality of image forming apparatuses to confirm the presence thereof, generates a list of image forming apparatuses from which there is a response as a network printer list screen, and transmits a response request to the image forming apparatuses from which there is a response;

a terminal display unit that displays the network printer list screen; and an installation executing unit that executes installation of a printer driver corresponding to an image forming apparatus for which an instruction is given on the network printer list screen;

wherein the printer searching unit causes an image forming apparatus from which there is a response to the response request to be highlighted in the display of the network printer list screen, and causes user information of a user that has operated a response button to be displayed.

* * * * *